United States Patent
Mitchell et al.

(10) Patent No.: US 9,624,716 B2
(45) Date of Patent: Apr. 18, 2017

(54) MULTI-LAYER SEALING SPACER FOR ENTRYWAY COMPONENTS

(71) Applicant: Endura Products, Inc., Colfax, NC (US)

(72) Inventors: Mike Mitchell, Winston-Salem, NC (US); George Heid, Charlotte, NC (US); Tomasz Jaskiewicz, Winston-Salem, NC (US); Brent Van Camp, Charlotte, NC (US)

(73) Assignee: ENDURA PRODUCTS, INC., Colfax, NC (US)

( * ) Notice: Subject to any disclaimer, the term of this patent is extended or adjusted under 35 U.S.C. 154(b) by 0 days.

(21) Appl. No.: 14/717,202

(22) Filed: May 20, 2015

(65) Prior Publication Data

US 2016/0340970 A1 Nov. 24, 2016

(51) Int. Cl.
| | | |
|---|---|---|
| E06B 7/23 | (2006.01) |
| F16J 15/02 | (2006.01) |
| E06B 1/70 | (2006.01) |
| E06B 1/52 | (2006.01) |

(52) U.S. Cl.
CPC ............ *E06B 7/2305* (2013.01); *E06B 1/524* (2013.01); *E06B 1/70* (2013.01); *F16J 15/022* (2013.01)

(58) Field of Classification Search
CPC ... E06B 1/70; E06B 7/16; E06B 1/705; E06B 7/2305
See application file for complete search history.

(56) References Cited

U.S. PATENT DOCUMENTS

| | | | |
|---|---|---|---|
| 3,851,420 A | 12/1974 | Tibbetts | |
| 4,111,583 A * | 9/1978 | Brady | E01D 19/06 14/73.1 |
| 4,476,653 A | 10/1984 | Speer et al. | |
| 5,136,814 A | 8/1992 | Headrick | |
| 5,179,804 A | 1/1993 | Young | |
| 5,364,109 A * | 11/1994 | Sihon | F02F 7/006 277/592 |
| 6,006,375 A | 12/1999 | Carr | |
| 6,030,694 A | 2/2000 | Dolan et al. | |
| 6,219,971 B1 | 4/2001 | Headrick | |
| 6,484,446 B2 | 11/2002 | Young | |
| 6,637,158 B2 | 10/2003 | Bennett | |
| 6,763,639 B2 | 7/2004 | Bennett et al. | |

(Continued)

FOREIGN PATENT DOCUMENTS

| | | | |
|---|---|---|---|
| CA | 2 501 307 | * | 4/2004 |
| CA | 2 500 143 | * | 9/2005 |

(Continued)

*Primary Examiner* — Gregory Strimbu
(74) *Attorney, Agent, or Firm* — Womble Carlyle Sandridge & Rice, LLP

(57) ABSTRACT

A spacer for sealing a joint between a first component and a second component of an entryway. The spacer may include substantially rigid support and a first gasket having a first uncompressed thickness (T1). The first gasket is attached to a first surface of the support. The first surface has at least one first boss extending therefrom by a distance (D1) such that (D1) is less than (T1). The at least one first boss is configured to abut a portion of the first component to provide the desired compression of the first gasket between the first component and the support.

22 Claims, 15 Drawing Sheets

(56) References Cited

U.S. PATENT DOCUMENTS

| | | | |
|---|---|---|---|
| 6,789,358 B2 | 9/2004 | Procton et al. | |
| 6,789,359 B2 | 9/2004 | Bauman et al. | |
| 7,263,808 B2 | 9/2007 | Massey et al. | |
| 7,600,346 B2 | 10/2009 | Meeks | |
| 7,669,369 B2 | 3/2010 | Henry et al. | |
| 7,775,011 B2 | 8/2010 | Baczuk et al. | |
| 7,874,106 B2 | 1/2011 | Pangburn et al. | |
| 7,877,940 B2 | 2/2011 | Meeks et al. | |
| 8,522,483 B2 | 9/2013 | Van Camp et al. | |
| 8,567,128 B2 | 10/2013 | Van Camp et al. | |
| 8,857,107 B1 * | 10/2014 | Key | E06B 1/70 49/460 |
| 2002/0078641 A1 | 6/2002 | Procton et al. | |
| 2002/0194787 A1 | 12/2002 | Bennett | |
| 2003/0005644 A1 | 1/2003 | Reithmeyer et al. | |
| 2003/0106269 A1 | 6/2003 | Bauman et al. | |
| 2003/0230387 A1 * | 12/2003 | Smith | B29C 65/18 156/581 |
| 2005/0198911 A1 | 9/2005 | Baczuk et al. | |
| 2006/0174545 A1 | 8/2006 | Young | |
| 2007/0227076 A1 | 10/2007 | Braun | |
| 2007/0266663 A1 | 11/2007 | Hopkins | |
| 2008/0222961 A1 | 9/2008 | Meeks | |
| 2008/0229669 A1 | 9/2008 | Abdollahzadeh et al. | |
| 2010/0077669 A1 * | 4/2010 | Daniel | G05G 9/047 49/475.1 |
| 2010/0162644 A1 | 7/2010 | Campbell et al. | |
| 2010/0307079 A1 | 12/2010 | Baczuk et al. | |

FOREIGN PATENT DOCUMENTS

| | | | |
|---|---|---|---|
| DE | 10 2012 218 035 | * | 4/2014 |
| EP | 2 543 810 | * | 1/2013 |
| GB | 2147647 | | 10/1984 |

* cited by examiner

MULTI-LAYER SEALING SPACER FOR ENTRYWAY COMPONENTS

FIELD OF DISCLOSURE

The present disclosure is related to entryways and door unit assemblies that define openings for ingress and egress from a building. More particularly, the present disclosure relates to devices for sealing joints between elements that form a frame around a door opening.

BACKGROUND

Homeowners and other property owners are well aware of the damage that can be caused by water that is allowed to pass through, around, or remain idle within an entryway. Unwanted water that finds its way between gaps can lead to wood rot and structural degradation. Over time the gaps may grow as components shift, exacerbating the problem of water entry. Eventually the structural integrity of the door unit assembly may be compromised, requiring full replacement.

As can be appreciated, gaps may occur wherever two materials or two elements are brought together. For example, a gap may occur between a threshold and a side jamb of an entryway. Other gaps may occur where a mullion joins a threshold.

Presently, the most common method of sealing these gaps requires the proper and sufficient application of caulk where two hard surfaces meet. Abutting hard surfaces rarely form water resistant seal themselves, and a seal only results when malleable caulk is provided therebetween.

In certain locations, sealing gaskets are used. The effectiveness of these seal gaskets, however, can be compromised by over-compression or under-compression that results due to the vagaries of the installation process. The effectiveness of these sealing gaskets also can be limited by high wear rates, or by using materials that may lose their initial elasticity, resulting in hardening of the material.

Therefore there is a need for a device that seals between entryway components under the proper degree of compression.

There is also a need for a device that provides the desired seal while limiting maintenance events that require replacement of the device.

SUMMARY

The present disclosure includes a spacer for sealing a joint between a first component and a second component of an entryway. The spacer may include substantially rigid support and a first gasket having a first uncompressed thickness T1. The first gasket is attached to a first surface of the support. The first surface has at least one first boss extending therefrom by a distance D1 such that D1 is less than T1. The at least one first boss is configured to abut a portion of the first component to provide the desired compression of the first gasket between the first component and the support.

The present disclosure also includes an entryway. The entryway may comprise a first framing component, a second framing component, and a spacer sealing a joint between the first component and the second component. The spacer may comprise a substantially rigid support, and a first gasket having a first uncompressed thickness T1. The first gasket is attached to a first surface of the support. The first surface comprises at least one first boss extending therefrom by a distance D1 such that D1 is less than T1. The at least one first boss abuts a portion of the first component to provide desired compression of the first gasket between the first component and the support.

Embodiments of the present disclosure also include a spacer for sealing a joint between a first component and a second component of an entryway. The spacer may include a substantially rigid support and a first gasket attached to a first surface of the support. The first gasket is intended to be compressed between the first component and the rigid support. The rigid support has means for allowing no more than a desired degree of compression of the first gasket between the first component and the support.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Figure 1:
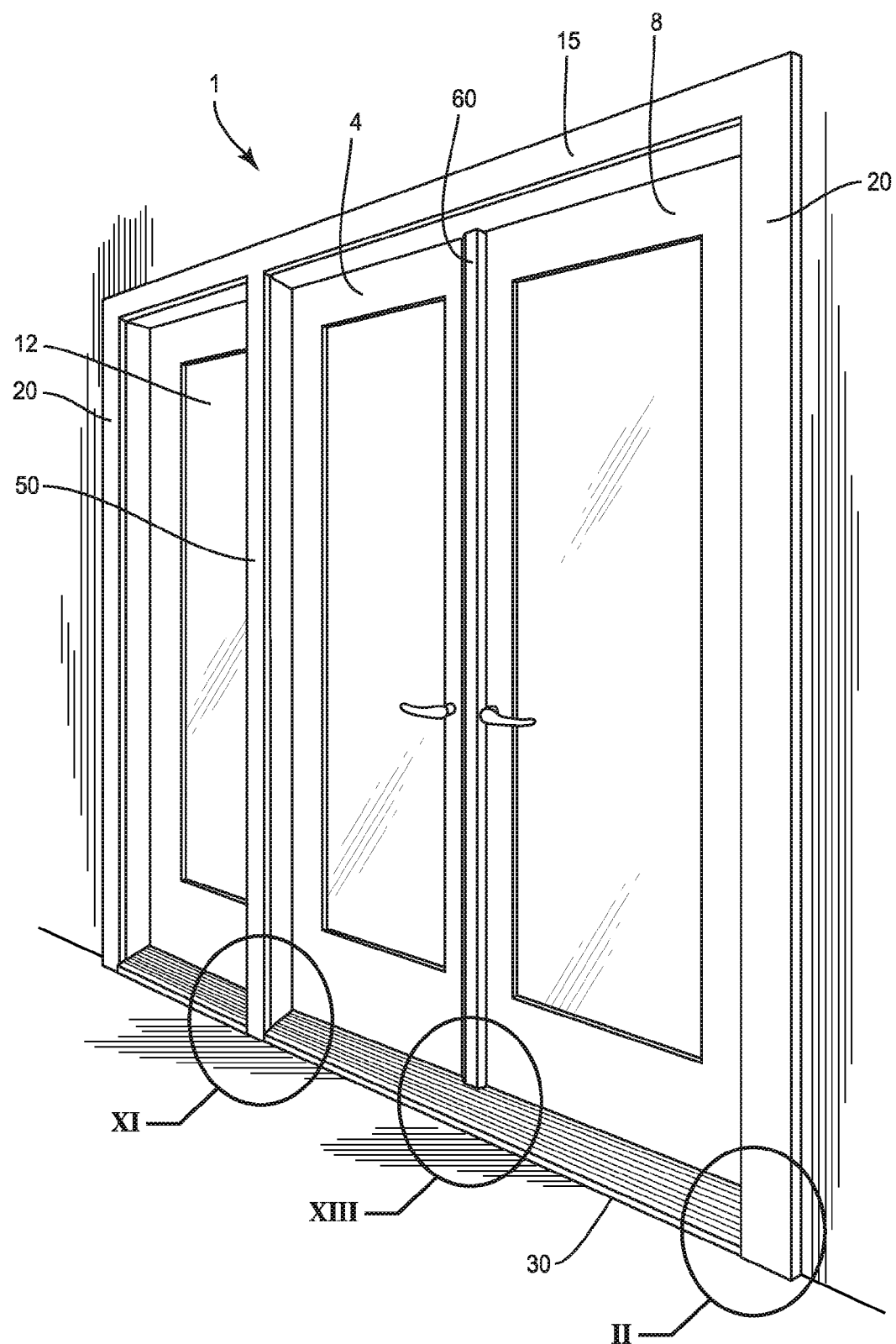
FIG. 1 schematically shows an entryway with several locations that may benefit from incorporating one or more spacers according to embodiments of the present disclosure.

FIG. 1 schematically shows an entryway 1 having several locations that may benefit from aspects of the present disclosure. The illustrated entryway 1 includes a French door arrangement with a first door panel 4 and a second door panel 8. The entryway 1 is also shown as including a sidelight 12. The top of the entryway 1 includes a header 15, and the edges of the entryway 1 are defined by side jambs 20. A threshold 30 extends along the bottom of the entryway 1. The sidelight 12 is separated from the door opening by a mullion 50 extending upward from the threshold 30. The configuration of the entryway 1 shown in FIG. 1 is provided as an example only and is not intended to limit the scope of this disclosure. Therefore, the entryway 1 may include a single door panel or a plurality of door panels. A plurality of door panels may be separated by movable astragals or fixed mullions. The entryway 1 may include a single sidelight 12, a sidelight 12 on each opposite side of the door panel(s), or no sidelight at all.

Figure 2:
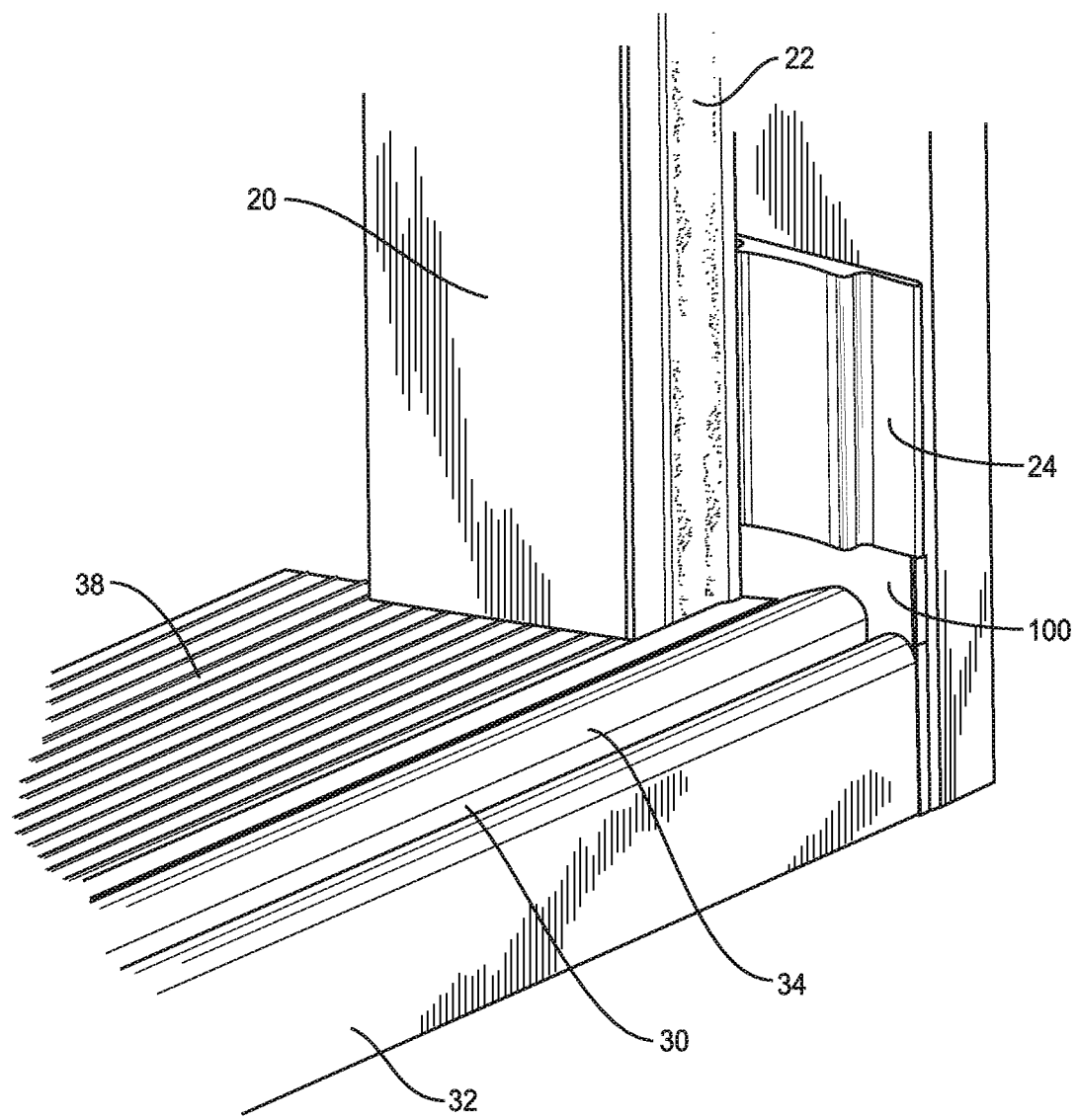
FIG. 2 is an example of a location similar to area II in FIG. 1, having a spacer of the present disclosure between a threshold and a side jamb.
Figure 3:
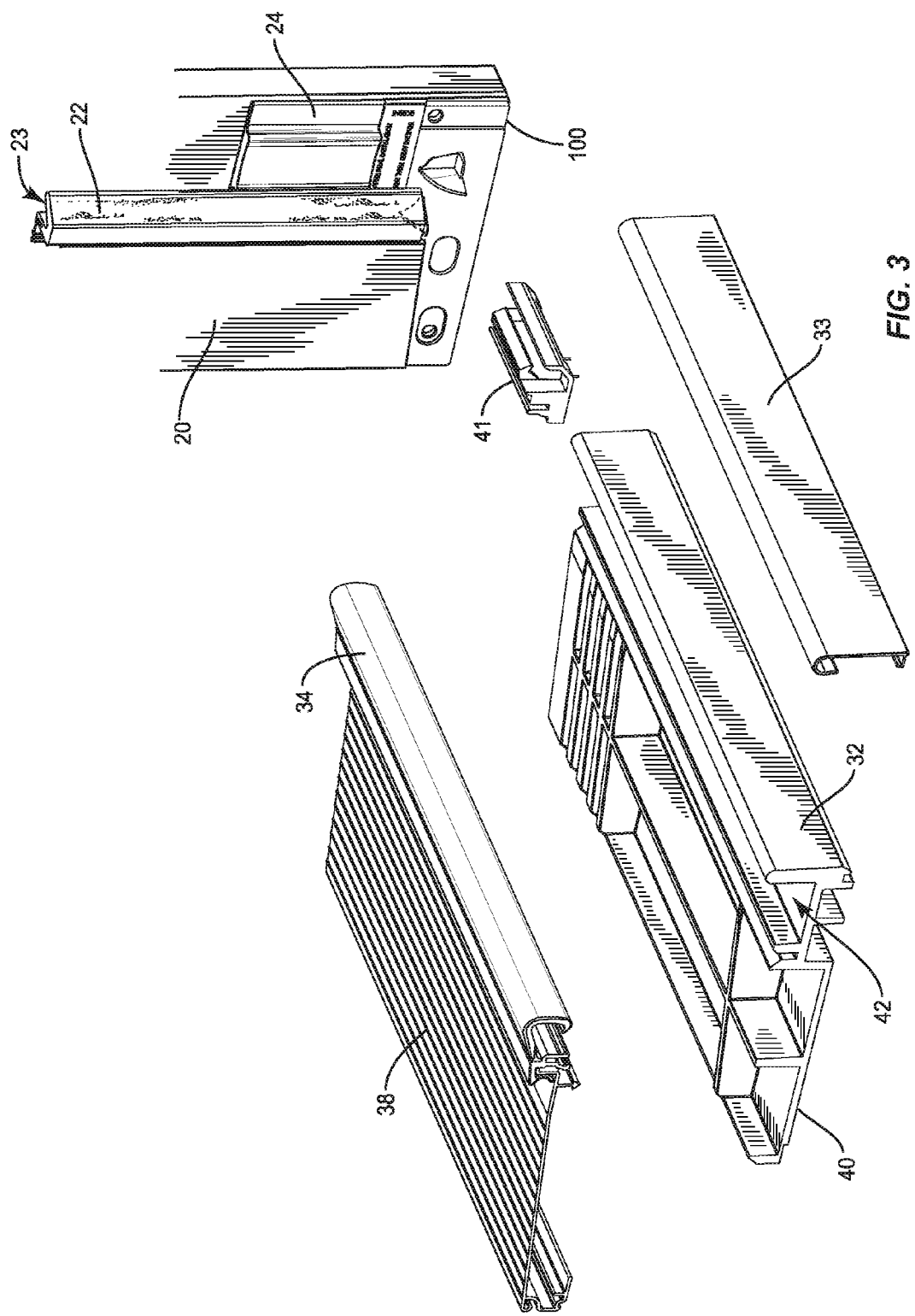
FIG. 3 shows an exploded view of FIG. 2.
Figure 4:
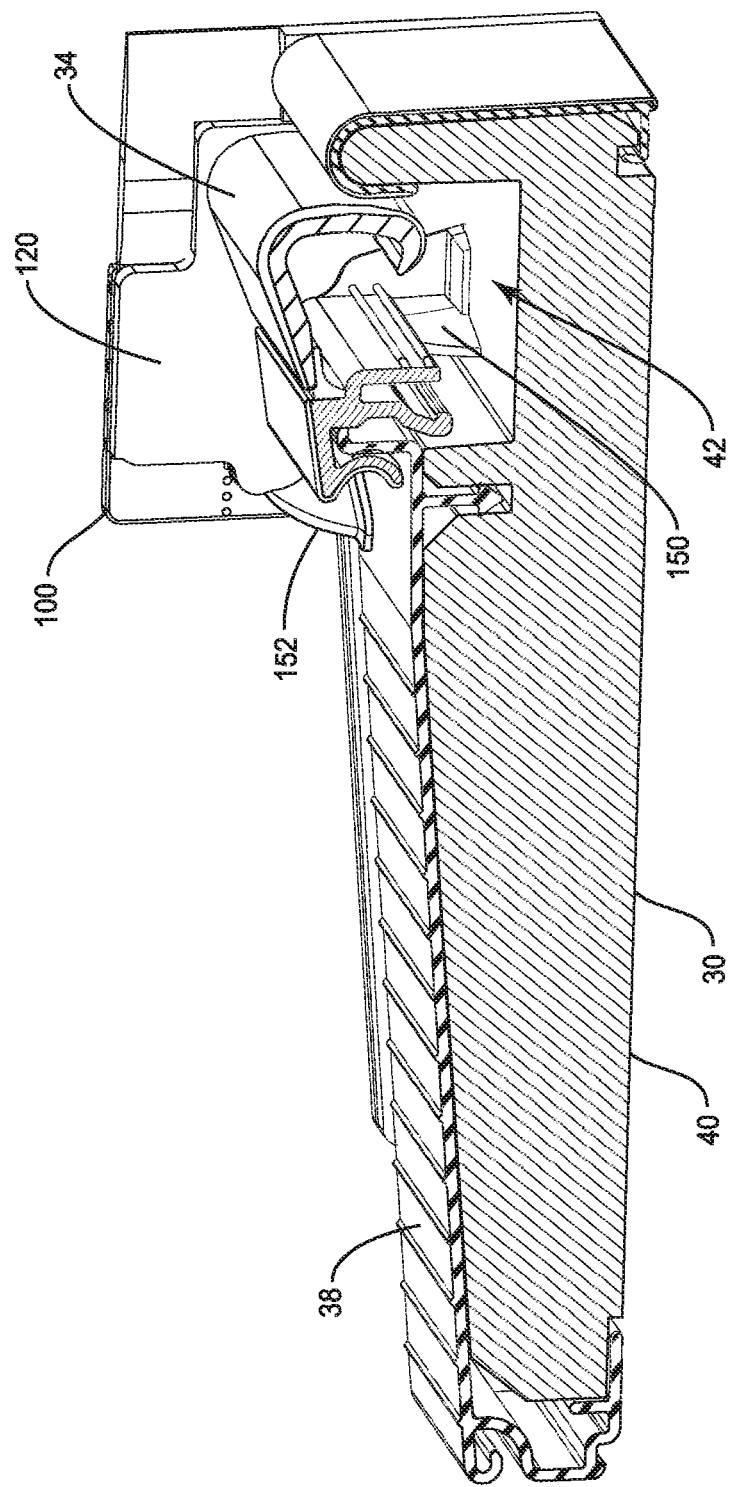
FIG. 4 shows a partial perspective cross section of FIG. 2.

FIG. 2 shows an example detailed view of an area II from schematic FIG. 1. Area II generally relates to a joint where an end of the threshold 30 abuts the side jamb 20. The side jamb 20 may include a weather-strip 22 extending along the height direction thereof, and may be fitted with a corner pad 24. The weather-strip 22 and the corner pad 24 primarily are provided for sealing with a closed door panel 4, 8. The threshold 30 may include a nosing 32 defining an interior side, a cap 34 that may be vertically adjustable (manually or automatically) to seal with a bottom of the door panels 4, 8. The threshold 30 may also include a deck 38 that sits upon a substrate 40 (as shown in FIGS. 3 and 4). As seen in FIG. 3, a channel 42 may be formed, in whole or in part, by the substrate 40 for accommodating the cap 34.

The joint between entryway components,(e.g. the side jamb 20 and the threshold 30 as seen in FIG. 2, is sealed by a spacer 100 according to a first embodiment of the present disclosure. As should be understood, the spacer 100 is intended to substantially fill the gap between an end of the threshold 30 and the side jamb 20 to minimize water and air infiltration through the joint.

FIG. 3 provides an exploded view of the components of FIG. 2. FIG. 3 shows the side jamb 20, the substrate 40, a nosing cover 33, the sill deck 38, and a base 41 that sits within the sill channel 42 and supports the cap 34.

In practice, the entryway 1 may be provided as a pre-hung door unit assembly where the components of the entryway 1 are pre-assembled prior to installation as part of the building. Therefore, for example, the spacer 100 may be placed along the end of the threshold 30 and then the side jamb 20 may be attached to the threshold 30 from the outside using fasteners such as screws, nails or staples.

FIG. 4 shows a partial cross section where the relative engagement between the spacer 100 and the threshold 30 is shown. The substrate 40 is provided with the sill deck 38, and a sill channel 42 is created. The cap 34 sits at least partially within the sill channel 42. The cap 34 is supported, in part, by a base located elsewhere along the sill channel 42. The spacer 100 is shown with a projection 150 extending into the sill channel 42. The spacer 100 is also shown with a protrusion 152 overlapping the top of the sill deck 38.

Figure 5:
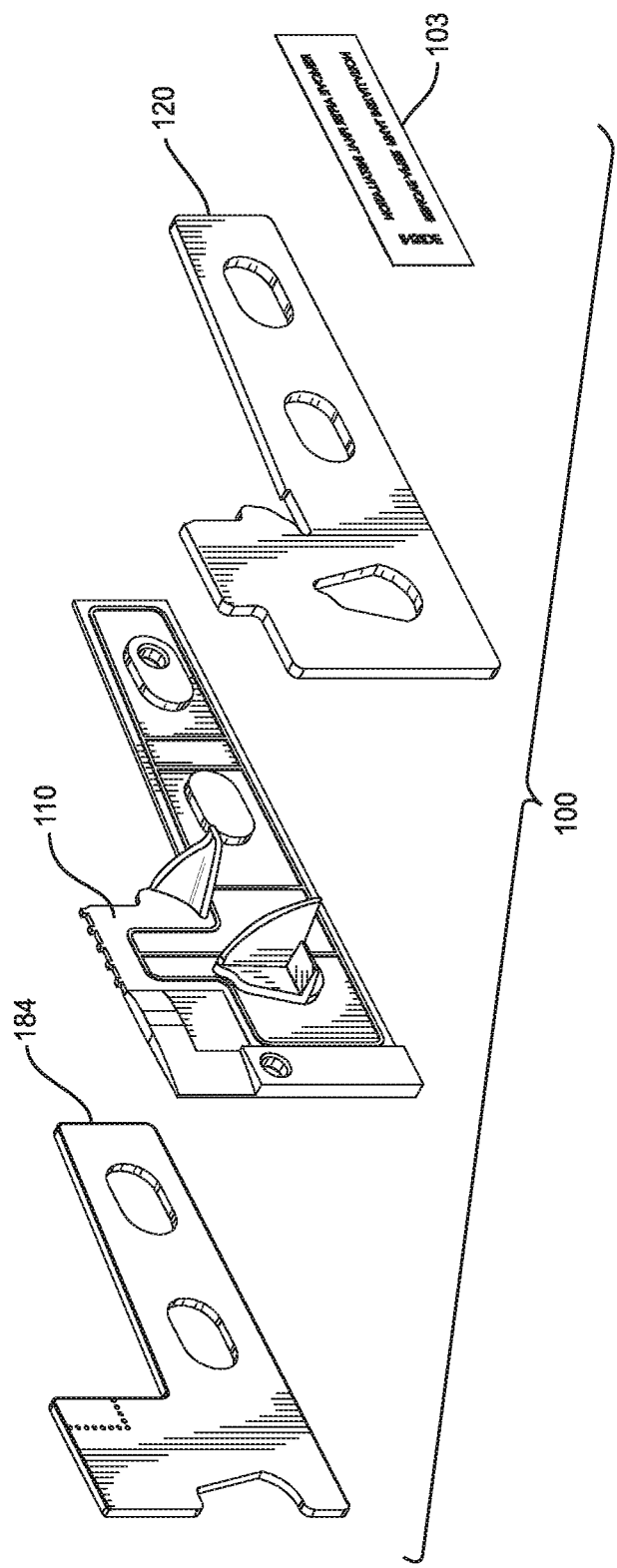
FIG. 5 shows an exploded view of an example of a first embodiment of a spacer usable in FIG. 3.

FIG. 5 shows the spacer 100 according to the first embodiment in an exploded view. The spacer 100 includes a support 110. The support 110 can be constructed of a substantially rigid material such as rigid polymers like ABS. The support 110 therefore may act as a stiffening platform for the spacer 100. The illustrated spacer 100 also includes a threshold gasket 120 for placement between the support 110 and the threshold 30, and a jamb gasket 184 for placement between the support 110 and the side jamb 20. Each gasket may be made from a relatively compressible material such as foam, rubber, silicon, or other known compressible materials that can form a seal between relatively hard surfaces. The material for the threshold gasket 120 may be selected based on a combination of factors, including cost, durability, tear resistance, resiliency, ability to avoid a permanent set and other factors.

FIG. 5 also shows an optional removable film 103. The film 103, such as mylar, is intended to protect portions of the spacer 100 prior to installation within the entryway 1, or prior to installation within the building as part of a door unit assembly. The film 103 may be positioned to protect the area of the spacer 100 that will be adjacent to the cap 34 of the threshold 30. Once the entryway 1 is in-use, the film 103 should be removed in a preferred embodiment.

Figure 6:
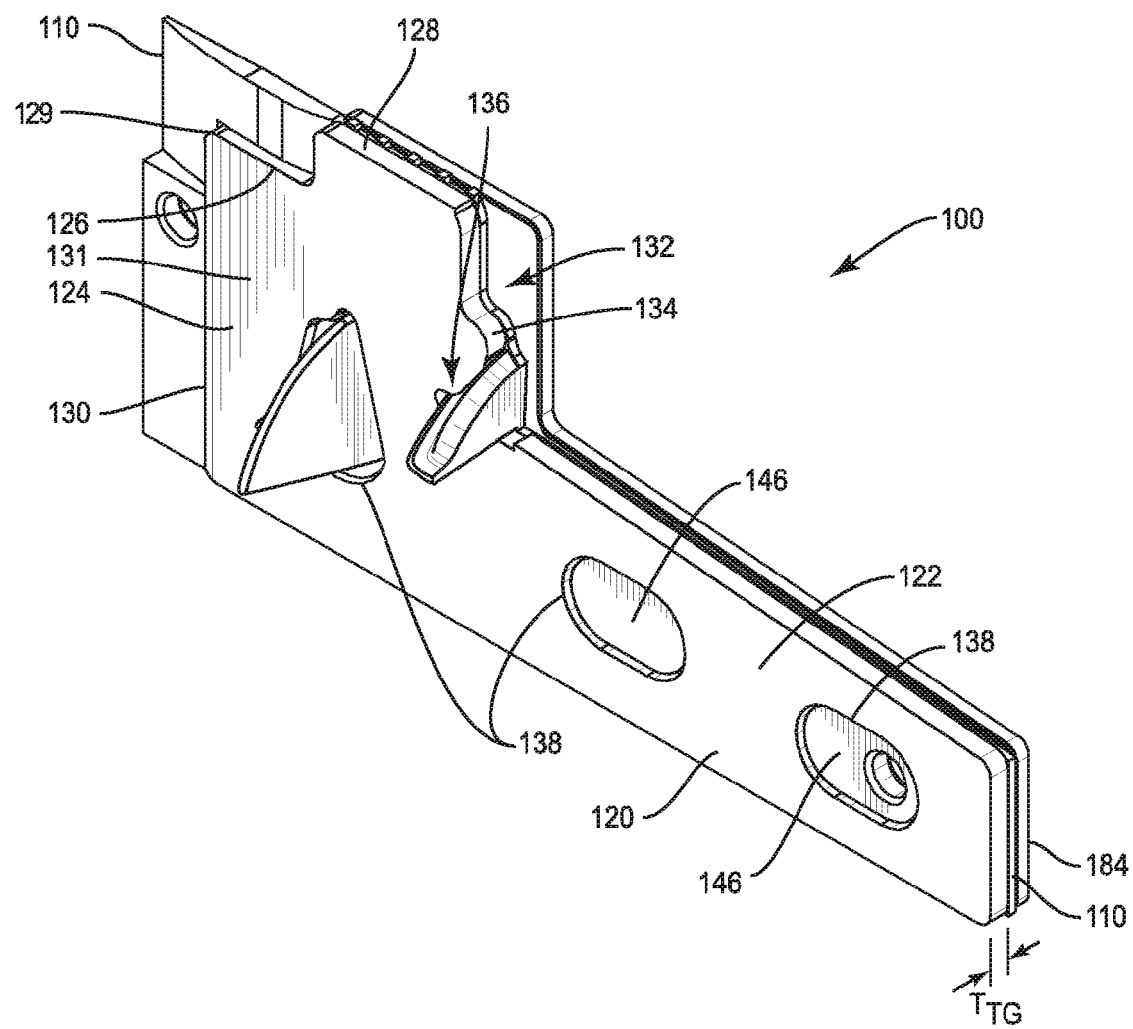
FIG. 6 shows a threshold-side view of the spacer of FIG. 5.

Continuing to FIG. 6, the threshold gasket 120 (and the spacer 100 as a whole) may have an overall shape that approximates with the profile of the threshold 30. The threshold gasket 120 may be considered as having a deck portion 122 to be positioned at the end of the threshold 30 at a portion of the threshold 30 generally corresponding with the deck 38. The threshold gasket 120 may also be considered as having a cap portion 124 positioned at the end of the threshold 30 generally corresponding with the portion of the threshold 30 positioned below a closed door panel 4.

The threshold gasket 120 may have a thickness $T_{TG}$ in an uncompressed state. While $T_{TG}$ could vary at different portions of the threshold gasket 120, it may be preferred that the threshold gasket thickness $T_{TG}$ is substantially uniform.

The periphery of the threshold gasket 120 may include one or more features to facilitate a desired interaction with the threshold 30 or the support 110. In the illustrated embodiment, the peripheral features include a step 126 located near the top edge 128 of the cap portion 124, and extending to at or near an interior edge 130. The step 126 assists with providing a proper fit for the threshold gasket 120 with the support 110.

The illustrated peripheral features also include a recess 132 defined along an exterior edge 134 of the cap portion 124, near the top edge 128. The recess 132 may result in an increased volume behind the weather-strip 22. The volume can help prevent wind-blown water from traveling up the weather-strip 22 and over the corner pad 24 because the weight of water within the volume would oppose the force on the water provided by the wind.

A cutout 136 is shown near the intersection of the deck portion 122 and the cap portion 124. The cutout 136 may be shaped to accommodate, e.g. at least partially surround, raised elements of the support 110.

The step 126, the recess 132, and the cutout 136 are examples from the illustrated embodiment and are not intended to limit the scope of this disclosure. Thus, a threshold gasket 120 within the scope of this disclosure may include zero, one, two, three, or more peripheral features.

In addition to the optional peripheral features, the threshold gasket 120 may include one or more apertures 138 passing through the threshold gasket 120 as also shown in FIG. 6. The apertures 138 may take a variety of sizes and shapes, but are generally configured based on corresponding elements extending from the support 110.

Example features of a threshold-side 140 of the support 110 will now be described in the embodiment shown in FIG. 7. The following features may be found individually or in any combination within embodiments of the present disclosure. The threshold-side 140 includes an attachment surface 142 for attachment to the threshold gasket 120 by friction, an adhesive layer, or other known mechanism. For purposes of this section, the attachment surface 142 is generally planar and will be used as a reference plane for other illustrated features of the threshold-side 140.

Figure 7:
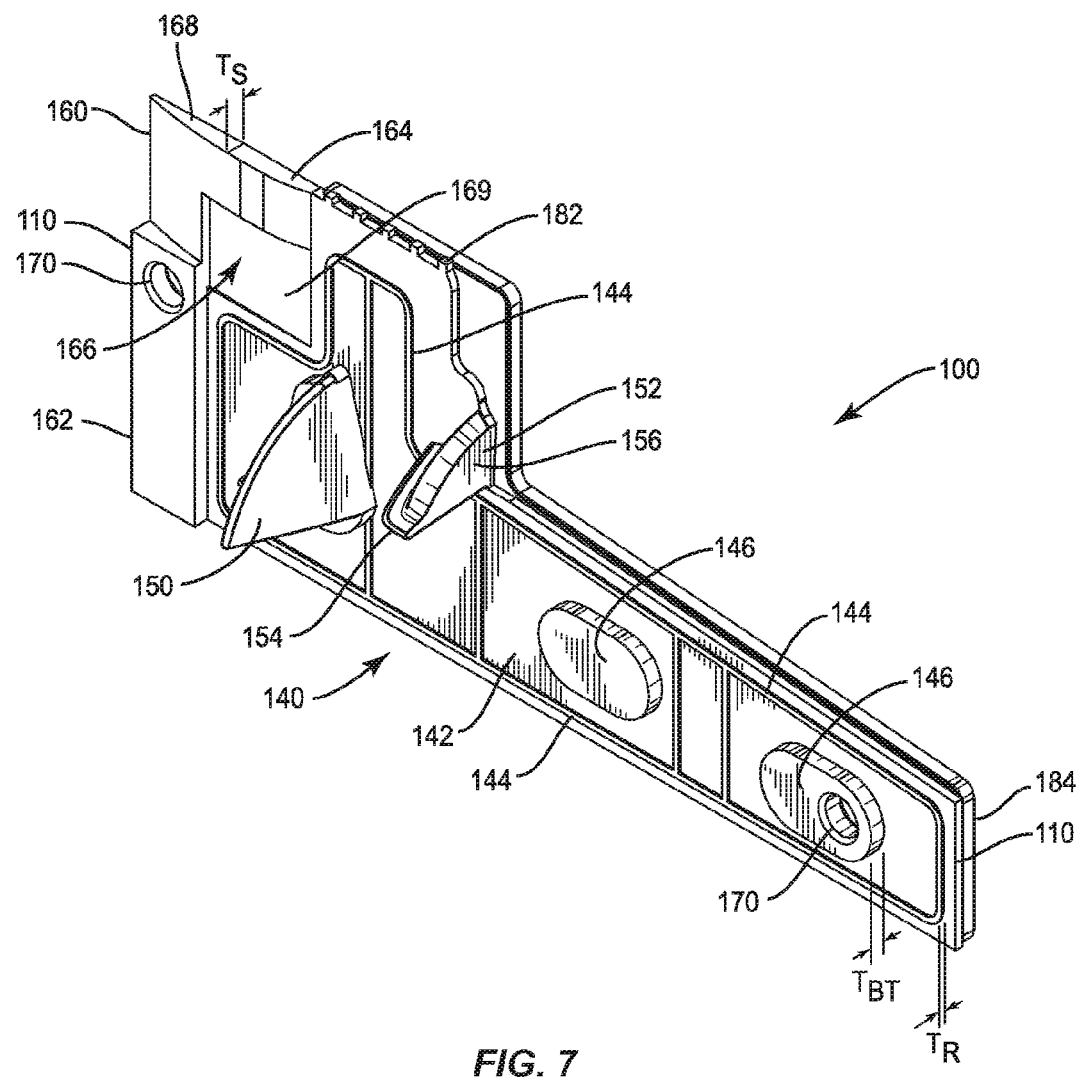
FIG. 7 shows a threshold-side view of an example support of the spacer of FIG. 5.

FIG. 7 shows a pattern of ribs 144 along the attachment surface 142. The ribs 144 may extend from the attachment surface 142 to by thickness $T_R$. These ribs 144 result in local areas of relatively higher compression of the threshold gasket 120 when the spacer 100 is in-use between entryway components. These local areas of higher compression, compared to the compression of the threshold gasket 120 at locations corresponding the reference plane, help to ensure a better seal between the support 110 and the threshold 30.

One or more bosses 146 extend from the attachment surface 142. The bosses 146 are positioned to correspond with the one or more apertures 138 through the threshold gasket 120. In other embodiments, the bosses 146 may be located outside the periphery of the threshold gasket 120. As used herein, the term "boss" is used to describe a relatively raised region, that is not limited by the shape of such a region. The bosses 146 are positioned as part of the spacer 100 to at least partially correspond with a rigid portion at the end of the threshold 30. The bosses 146 may extend from the attachment surface 142 by a distance $T_{BT}$, where the thickness of the bosses 146 is less than the thickness $T_{TG}$ of the uncompressed threshold gasket 120. As a result of the relative thicknesses, the bosses 146 provide a compression control feature for the spacer 100. In other words, the bosses 146 are configured to have a distal end abut the threshold 30 to define a minimum separation between the end of the threshold 30 and the attachment surface 142. This in effect provides a control on the degree of maximum compression of the threshold gasket 120 to help prevent an over-compression situation that can have negative effects on the seal adjacent to the end of the threshold 30.

Additional example features of the threshold-side 140 include one or more projections 150 extending from attachment surface 142 or extending from a portion of a boss 146. The projection 150 is shaped and located to provide alignment between the spacer 100 and the threshold 30. As best seen in FIG. 4, the projection 150 of the illustrated embodiment extends into the channel 42 of the threshold 30 below the cap 34 to help position the spacer 100 along a height direction and an interior-exterior direction relative to the threshold 30.

The threshold-side 140 may also include a protrusion 152 extending from the attachment surface 142. The protrusion 152 may include a deck alignment portion 154 to extend over the deck 38 and help position the spacer 100 relative to the threshold 30. The protrusion 152 may include a plug portion 156 shaped and positioned to extend into a gap 23 between portions of the weather-strip 22 as best seen in broken lines in FIG. 3. The deck alignment portion 154 also caps the bottom end of the weather-strip 22 to prevent moisture from wicking up the weather-strip 22.

In some embodiments, the threshold-side 140 of the support 110 may be provided with anti-wear or gasket protection features configured to reduce the peeling forces applied to the interior edge 130 of the threshold gasket 120. These features can extend the longevity of the threshold gasket 120, helping maintain attachment between the support 110 and the threshold gasket 120.

The anti-wear features may include a raised shoulder 160 located along at a portion of an inner edge 162 of the support 110. The raised shoulder 160 may also extend along a portion of the top surface 164 of the support 110. This location of the raised shoulder 160 may also be described as the leading corner of the spacer 100 because this location is the first edge by which a closing door panel 4 would pass during a closing action. The shoulder 160 may have a relative shoulder thickness $T_S$, which may be equal to the boss thickness $T_{BT}$.

The shoulder 160 partially creates a pocket 166. When the threshold gasket 120 is attached to the attachment surface 142, a portion of the threshold gasket 120 sits within the pocket 166. Because the shoulder 160 is raised relative to the attachment surface, the shoulder 160 protects some of the thickness of the threshold gasket 120. Peeling can occur when contact is made with the peripheral side 129 of the threshold gasket 120, particularly along the interior edge 130. Preferably peeling should be minimized by having contact occur only with the face 131 of the threshold gasket 120. The shoulder 160 hides a portion of the peripheral side 129 to help minimize peeling forces as the door panel 4 closes.

In one embodiment, the thickness $T_S$ of at least a portion of the shoulder 160 varies as a distance from the inner edge 162. For example, the shoulder 160 may provide a ramp structure 168 where $T_S$ increases as a function of increasing distance from the inner edge 162.

In some embodiments, protection of the threshold gasket 120 from peeling forces as the door panel 4 closes may be increased further by providing a surface 169 of the pocket 166 at least partially recessed relative to the attachment surface's reference plane and relative to the shoulder 160. This configuration increases the relative thickness of the shoulder 160 with respect to the threshold gasket 120.

In some embodiments, one or more holes 170 may be provided through the support 110 to help align the spacer 100 with the threshold 30. In some cases, fasteners may be passed through the holes 170 to secure the spacer 100 to the threshold 30 during installation or shipping.

Figure 8:
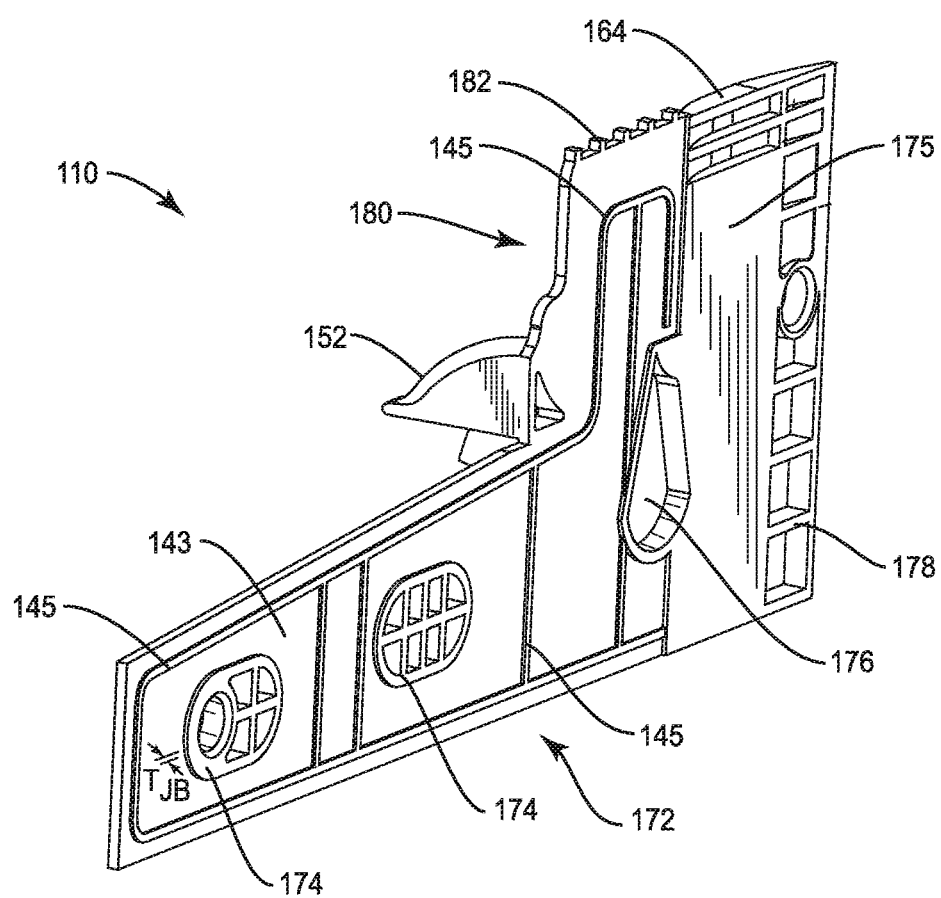
FIG. 8 shows a jamb-side view of the support of the spacer of FIG. 5.
Figure 9:
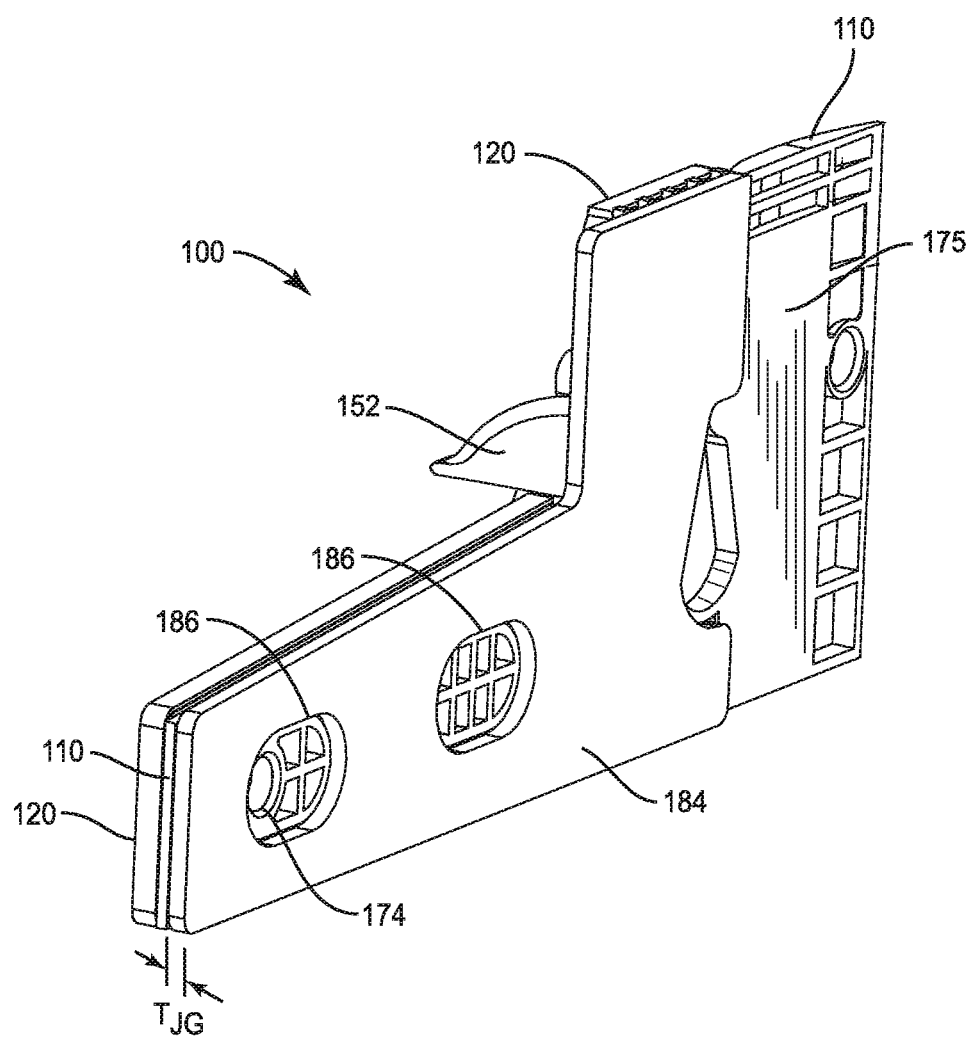
FIG. 9 shows a jamb-side view of the spacer of FIG. 5.

FIG. 8 shows a jamb-side 172, and optional features thereof, of the support 110. The jamb-side 172 also includes an attachment surface 143 that is used for attaching a jamb gasket 184 as shown in FIG. 9. Similar to the threshold-side 140, the jamb-side 172 may also include a pattern of ribs 145. One or more jamb-side bosses 174 may be positioned to pass at least partially though the jamb gasket 184. FIG. 8 also shows a second jamb-side boss 175 positioned to be alongside the jamb gasket 184. The jamb-side bosses 174, 175 may have a thickness $T_{JB}$ relative to the attachment surface 143. The jamb-side bosses 174, 175 can also act as compression control stops, limiting the relative separation between the respective attachment surface 143 and the side jamb 20.

The jamb-side 172 is illustrated with a plurality of cavities 176 formed therein. These may be provided for minimizing the amount of material used when constructing the support 110, while in turn, maintaining ridges 178 for maintaining the relative structural rigidity of the support 110.

Similar to the threshold gasket 120 discussed above, the peripheral shape of the support 110 may be generally configured to approximate the profile of the threshold 30. Like the threshold gasket 120, the support 110 may also be provided with optional peripheral features to impart additional advantages to the design. For example, the support may include a groove 180 corresponding to the recess 132 of the threshold gasket 120 to provide an even larger reservoir for accumulated moisture.

Further, the top surface 164 of the support 110 may include a plurality of tabs 182 extending upwardly therefrom in a position corresponding with the corner pad 24. The tabs 182 may further improve a seal formed between the spacer 100 and the corner pad 24. Specifically the bottom of the corner pad 24 may rest on the top surface 164 with the tabs 182 pressing against the bottom of the corner pad 24. The force provided by the tabs 182 can create an improved seal because of the use of varied compression.

FIG. 9 shows the spacer 100 having a jamb gasket 184 for positioning between the support 110 and the side jamb 20. The jamb gasket 184 may be the same material as the threshold gasket 120. In other embodiments, the jamb gasket 184 may be a different material from the threshold gasket 120. Different materials may be desired where the jamb gasket 184 is placed between stationary elements, and where the threshold gasket 120 is placed at least partially between relatively movable elements. For example, where the cap 34 adjusts each time the door panel 4 opens and closes, a more durable material may be desired for the threshold gasket 120.

Continuing with FIG. 9, the jamb gasket 184 is intended to be fixed to the attachment surface 143 on the jamb-side 172 of the support 110. In one embodiment, the jamb gasket 184 has an adhesive layer for attachment to the support 110. The jamb gasket 184 has an uncompressed thickness $T_{JG}$, which should be greater than the thickness of the jamb-side bosses 174, 175. In the illustrated embodiment the jamb gasket 184 is thinner than the threshold gasket 120, and the bosses 146 are thicker than the thickness $T_{JB}$ of the jamb-side bosses 174, 175. The jamb gasket 184 may also include one or more jamb-side apertures 186 or peripheral features to correspond with the jamb-side bosses 174, 175.

Figure 10:
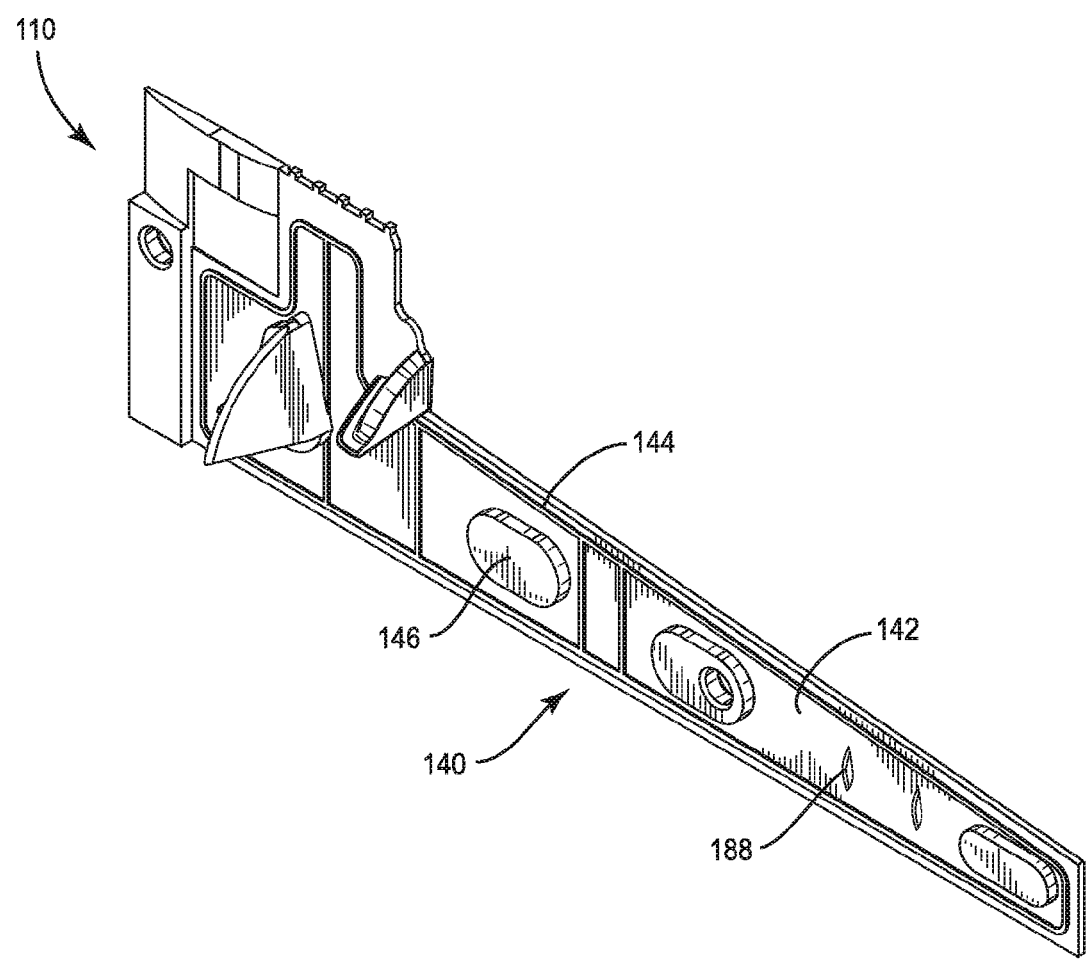
FIG. 10 presents a second embodiment of a spacer for use between a threshold and a side jamb at area II of FIG. 1.

Embodiments of the spacer 100, including embodiments of the support 110, may have different sizes to correspond with thresholds 30 of different widths. As seen in FIG. 10, the inventors contemplate at least one embodiment of the support 110 having slots 188 to form areas of weakness at various locations along the deck portion of the spacer 100. As such, the support 110 may be provided in a single large size that could be relatively easily converted to smaller standard sizes by removing an end portion of the support 110 (and corresponding gasket portions) using the select desired slot 188. In other words, a select one of the areas of weakness is used to break off any excess length of the support 110.

Figure 11:
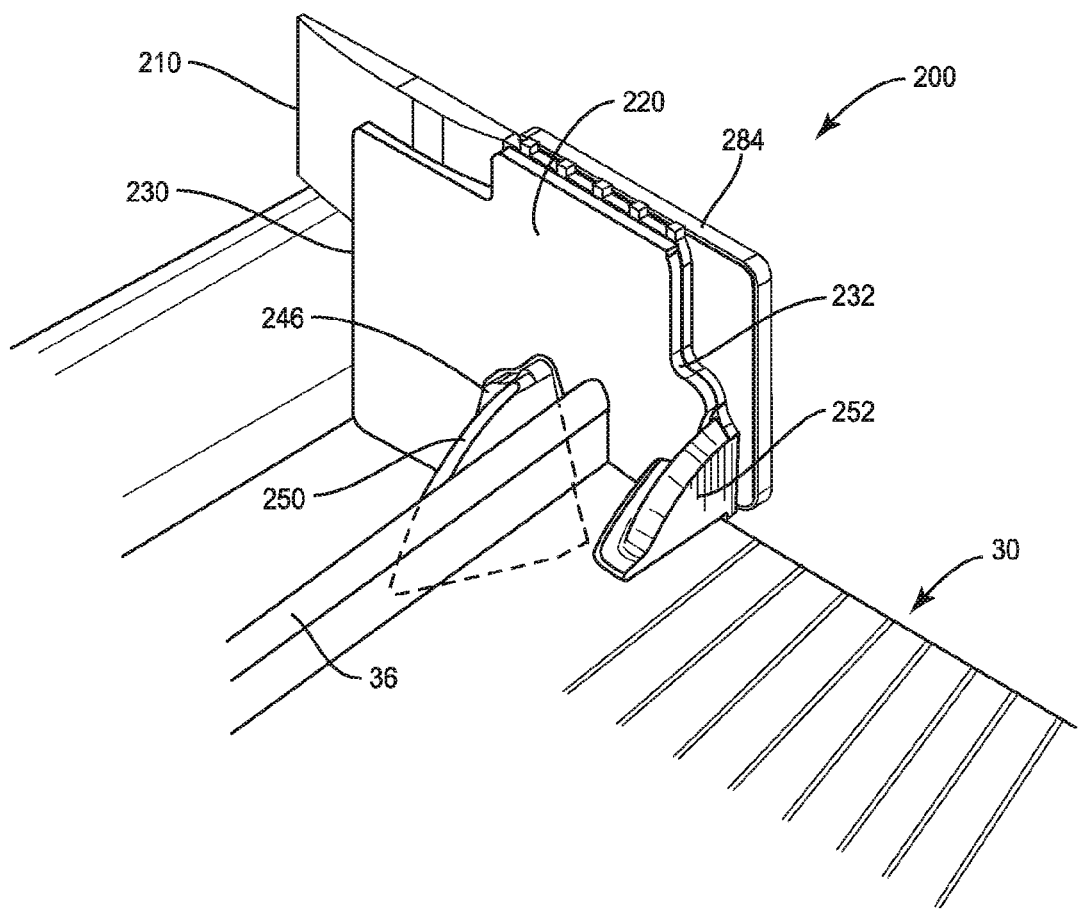
FIG. 11 is an example of a spacer of the present disclosure between a mullion and a portion of a threshold, such as shown in area XI of FIG. 1.

Turning to FIG. 11, a spacer of a second embodiment, "a second spacer 200" as used herein, may be beneficially provided at area XI of FIG. 1. Area XI refers to an area where a mullion 50 meets the threshold 30. The term "second" as used to modify "spacer" in this section, is not used to limit the scope of this disclosure in any way, but is instead used solely to facilitate clarity within this disclosure. The second spacer 200 may be used to seal a joint between the mullion 50 and the cap 34 (not shown in FIG. 11) of the threshold 30. The second spacer 200 has many of the same features as discussed above with respect to the spacer 100, and in one sense may be generally understood as comprising only a portion similar to the cap portion 124 of the spacer 100. One of ordinary skill in the art will understand when the features discussed above with respect to the spacer 100 of the first embodiment do and do not also apply to the second spacer 200 based on the nature of this disclosure as accompanied by the figures.

Each second spacer 200 of the present disclosure includes a support 210. The support 210 is constructed of a relatively rigid, i.e. uncompressible, material such as polymers like ABS. The support 210 therefore may act as a stiffening platform for the second spacer 200.

Each second spacer 200 also includes at least one gasket of compressible material. The second spacer 200 includes at least a cap gasket 220 for placement between the support 210 and the cap 34. The features of the cap gasket 220 should be generally understood in view of FIG. 11 and the discussion of the threshold gasket 120 discussed above.

The second spacer 200 may also include a mullion gasket 284 for placement between the support 210 and the mullion 50. The features of the mullion gasket 284 should be generally understood as being similar to and inclusive of the features discussed above with respect to the jamb gasket 184.

Example features of the cap-side 240 of the support 210 will now be described in view of FIG. 12. The features of the mullion-side of the support 210 should be understood in view of corresponding areas of the jamb-side 172 of the support 110. The cap-side 240 includes an attachment surface 242 for attachment to the cap gasket 220 by friction, an adhesive layer, or other known mechanism. For purposes of this section, the attachment surface 242 is generally planar and will be used as a reference plane for other illustrated features of the cap-side 240.

Figure 12:
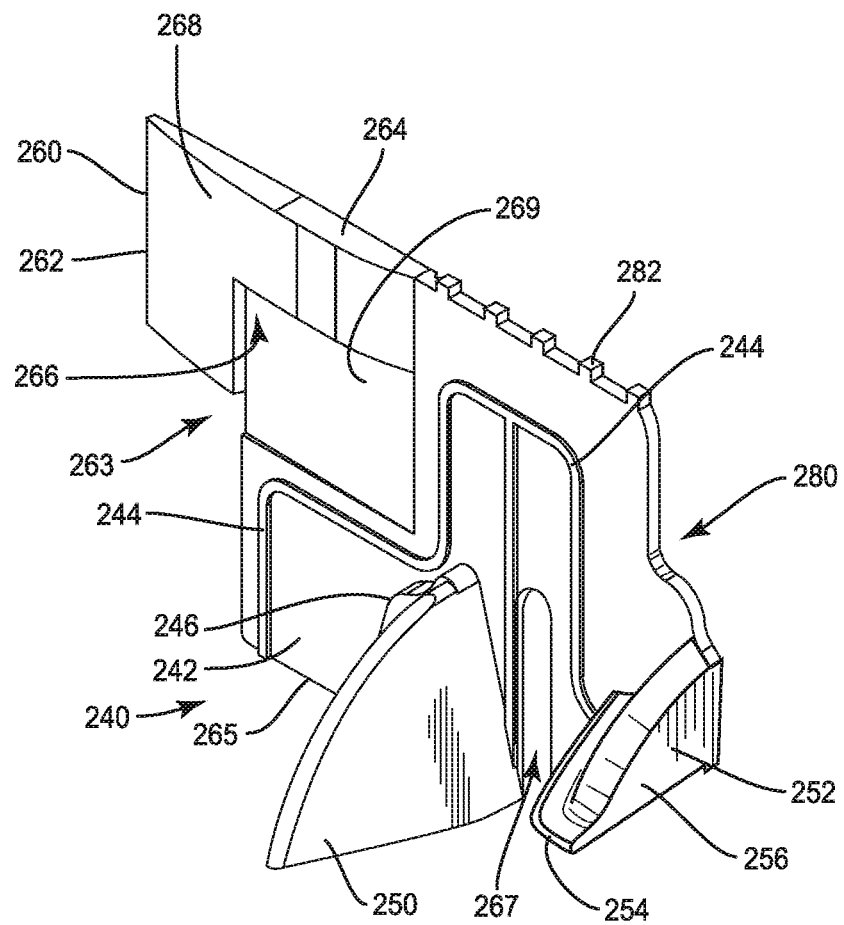
FIG. 12 shows a support of a spacer according to FIG. 11.

FIG. 12 shows a pattern of ribs 244 along the attachment surface 242. The ribs 244 may extend from the attachment surface 242 to by thickness $T_R$ (as shown in FIG. 7). These ribs 244 result in local areas of relatively higher compression of the cap gasket 220 when the second spacer 200 is pressed between entryway components.

At least one cap boss 246 extends from the attachment surface 242. The cap boss 246 is positioned to pass outside the profile of the cap gasket 220, or is positioned to correspond with an aperture through the cap gasket 220. The cap boss 246 is positioned as part of the second spacer 200 to at least partially correspond with a rigid portion at the end of the cap 34. The cap boss 246 may extend from the attachment surface 242 by a distance such that the thickness (see $T_{BT}$ in FIG. 7) of the cap boss 246 is less than the thickness of the uncompressed cap gasket 220. As a result of the relative thicknesses, the cap boss 246 provides a compression control feature for the second spacer 200. In other words, the cap boss 246 is configured to abut the cap 34 to define a minimum separation between the end of the cap 34 and the attachment surface 242. This in effect provides a control on the degree of maximum compression of the cap gasket 220 to help prevent an over-compression situation that can have negative effects on the seal adjacent to the end of the cap 34.

Additional example features of the cap side 240 include at least one projection 250 extending from the attachment surface 242 or a portion of the cap boss 246. The projection 250 is shaped and located to provide alignment between the second spacer 200 and the threshold 30. FIG. 11 shows a portion of the projection 250 drawn in hidden lines where the projection 250 is disposed behind the dam 36 in the illustrated view.

The cap side 240 may also include a protrusion 252 extending from the attachment surface 242. The protrusion 252 may include a deck alignment portion 254 to extend over the deck 38 and help position the second spacer 200 relative to the threshold 30. The protrusion 252 may include a plug portion 256 shaped and positioned to extend into and cap the bottom end of the weather-strip 22 in a manner substantially similar to the configuration shown in shadow in FIG. 3. The deck alignment portion 254 also covers the end of the weather-strip 22 to prevent moisture from wicking up the weather-strip 22.

In some embodiments, the cap side 240 of the support 210 may be provided with anti-wear or gasket protection features configured to reduce the peeling forces applied to an interior edge 230 of the cap gasket 220 to extend the longevity of the cap gasket 220 and maintain attachment between the support 210 and the cap gasket 220.

The anti-wear features may include a raised shoulder 260 located along an inner edge 262 of the support 210. The raised shoulder 260 may also extend along a portion of the top surface 264 of the support 210. This area may also be described as the leading corner of the second spacer 200 because it is the first edge by which a closing door panel 4 would pass. The shoulder 260 may have a relative shoulder thickness $T_S$ (as seen in FIG. 7) that may be equal to the cap boss thickness. The shoulder 260 can partially create a pocket 266. When the cap gasket 220 is attached to the attachment surface 242, a portion of the cap gasket 220 sits within the pocket 266. The relatively raised nature of the shoulder 260 protects some of the thickness of the cap gasket 220 to minimize peeling forces as discussed above with respect to the first spacer 100.

In one embodiment the thickness $T_s$ of at least a portion of the shoulder 260 varies as a distance from the inner edge 262. For example, the shoulder 260 may provide a ramp structure 268 where $T_S$ increases as a function of increasing distance from the inner edge 262.

In some embodiments, protection of the cap gasket 220 from peeling forces may be increased further by providing a surface 269 of the pocket 266 at least partially recessed relative to the attachment surface's reference plane and the shoulder 260. This configuration increases the relative thickness of the shoulder 260 with respect to the cap gasket 220 without extending the shoulder 260 beyond the relative thickness of the cap bosses 246 with respect to the attachment surface 242.

Other optional features of the support 210 and the cap gasket 220 having been described previously with respect to the spacer 100 and threshold gasket 120 include a groove 280 in the support 210 (as shown in FIG. 12) and a corresponding recess 232 in the cap gasket 220 (as shown in FIG. 11). The recess 232 and groove 280 may result in an increased volume behind the weather-strip 22. The volume can help prevent wind-blown water from traveling up the weather-strip 22 and over the corner pad 24 because the weight of water within the volume would oppose the force on the water provided by the wind. The support 210 may also include tabs 282 similar to those described above with respect to spacer 100. The tabs 282 may further improve a seal formed between the spacer 200 and the corner pad 24. Specifically the bottom of the corner pad 24 may rest on the top surface 264 with the tabs 282 pressing against the bottom of the corner pad 24. The force provided by the tabs 282 creates can create an improved seal because of the use of varied compression.

Use of the second spacer 200 to fill a gap between the mullion 50 and the cap 34 can result in one or more features of the support 210 that may be unique from the first embodiment of spacer 100. For example, the second spacer 200 may have a profile to allow the second spacer 200 to at least partially fit within the channel 42, instead of substantially along an outside end of the threshold 30. Therefore, an inner edge 262 of the support 210 may have a first notch 263 (shown in FIG. 11) to allow the second spacer 200 to be positioned around the nosing 32 of the threshold 30. Further, as shown in FIG. 11, a bottom edge 265 of the support 210 may comprise a second notch 267 to allow the second spacer to be positioned around a dam 36 of the threshold 30.

Figure 13:
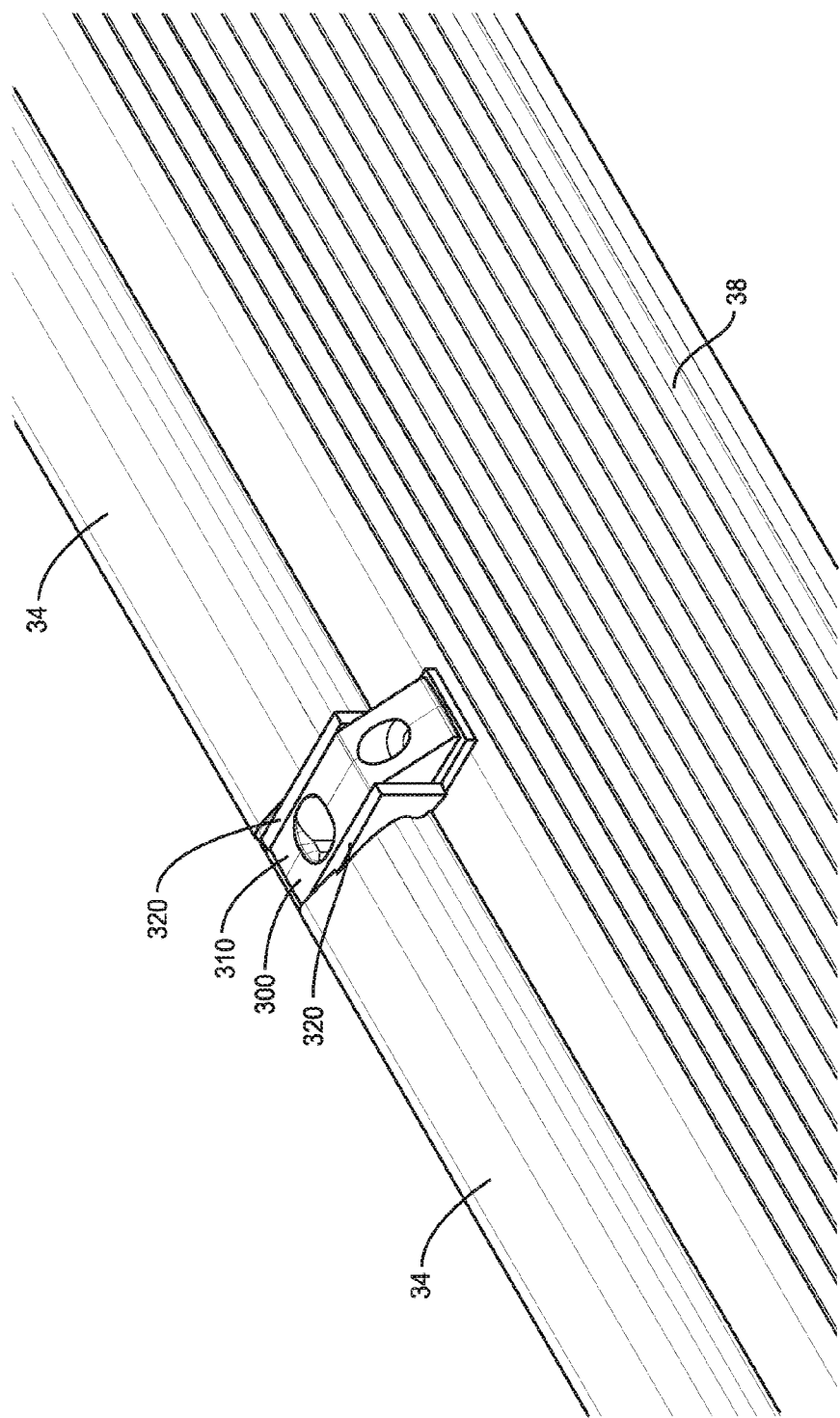
FIG. 13 is an example of a spacer of the present disclosure between separate caps of the threshold, such as shown in area XIII of FIG. 1.
Figure 14:
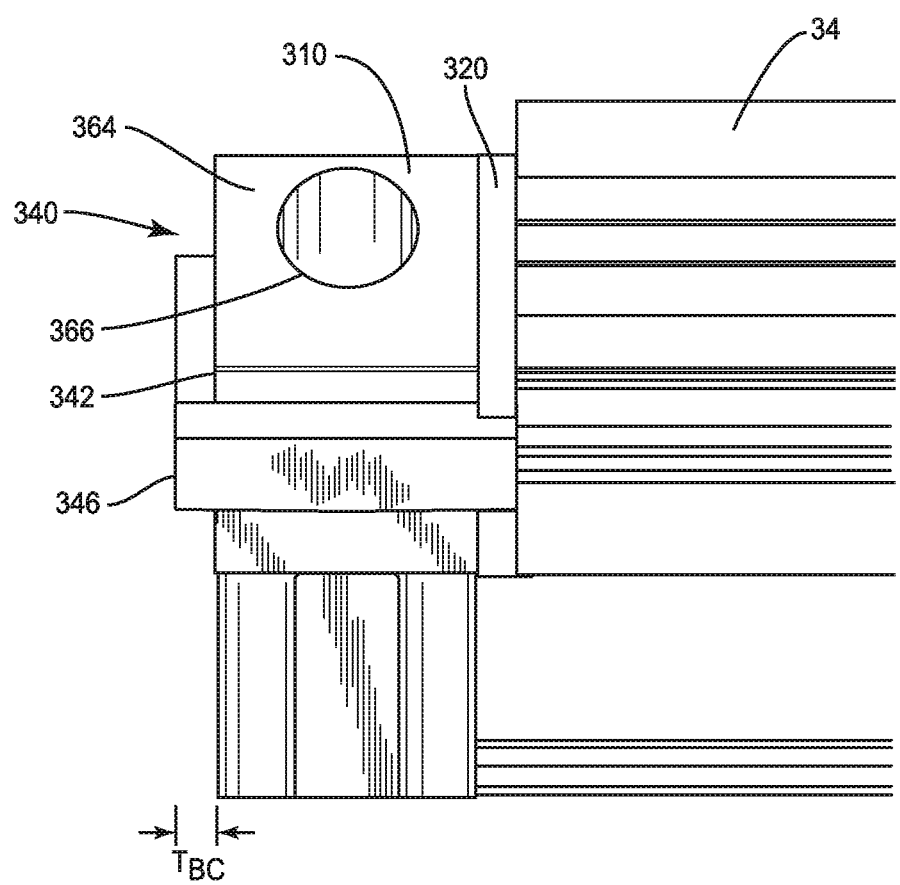
FIG. 14 shows the spacer of FIG. 13.
Figure 15:
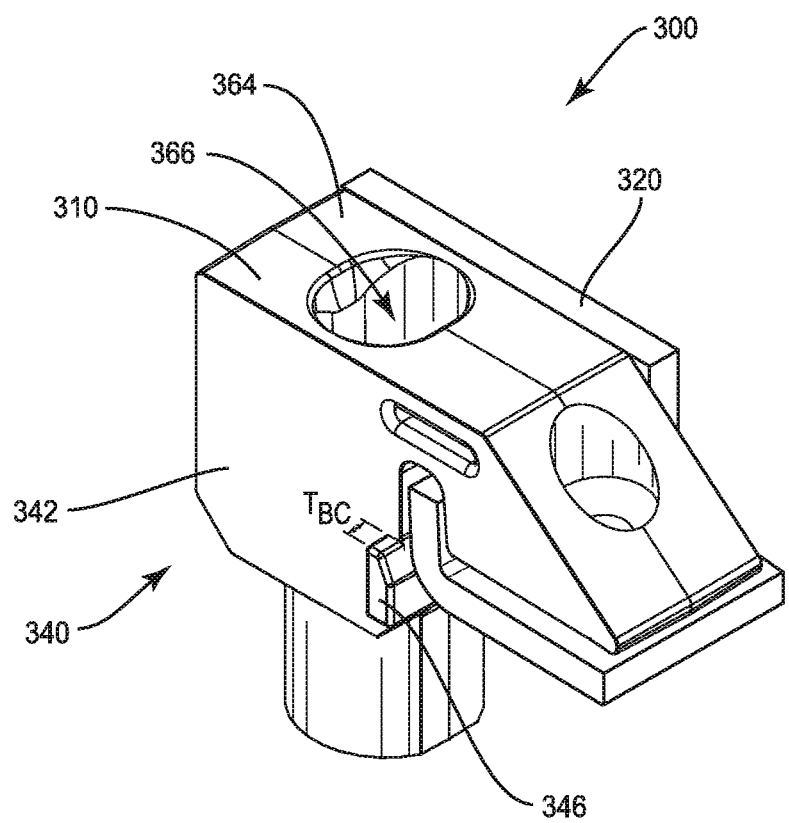
FIG. 15 shows the support of the spacer of FIG. 13.

Turning to FIGS. 13-15, a spacer of a third embodiment, "a third spacer 300" as used herein, may be beneficially provided at area XIII of FIG. 1, where two caps 34 come together along the threshold 30 at a location below an astragal 60 provided at the junction of the first door panel 4 and the second door panel 8. The term "third" as used to modify "spacer" in this section, is not used to limit the scope of this disclosure in any way, but is instead used solely to facilitate improved clarity within this disclosure. The third spacer 300 may be used to seal a joint between a pair of adjacent caps 34.

The third spacer 300 should be understood to be related to the broadest aspects of the present disclosure in so much as the third spacer 300 includes a support 310 preferably made from rigid or uncompressible material, and at least one gasket (a cap gasket 320) made from relatively compressible materials, where the third spacer 300 is used to seal a joint between components within an entryway 1. The discussion of example materials presented above should be understood to apply also to the third spacer 300.

Example features of a sealing-side 340 of the support 310 will now be described in view of FIG. 15. Because the third spacer 300 is sealing a joint between two substantially similar caps 34, it can be expected that the third spacer 300 will have substantially identical sealing-sides 340 on both sides of the third support 310. The sealing side 340 includes an attachment surface 342 for attachment of a cap gasket 320 by friction, an adhesive layer, or other known mechanism. For purposes of this section, the attachment surface 342 is generally planar and will be used as a reference plane for other illustrated features of the sealing-side 340. For clarity of illustration, the third spacer 300 in FIG. 15 has a cap gasket 320 shown on only one side.

At least one cap boss 346 extends from the attachment surface 342. The cap boss 346 is positioned to pass outside the profile of the cap gasket 320, or is positioned to correspond with an aperture through the cap gasket 320. The cap boss 346 is positioned as part of the third spacer 300 to at least partially correspond with a rigid portion at the end of the cap 34. The cap boss 346 may extend from the attachment surface 342 by a thickness $T_{BC}$, where $T_{BC}$ is less than the thickness of the uncompressed cap gasket 320. As a result of the relative thicknesses, the cap boss 346 provides a compression control feature for the third spacer 300. In other words, the cap boss 346 is configured to abut the cap 34 to define a minimum separation between the end of the cap 34 and the attachment surface 342. This in effect provides a control on the degree of maximum compression of the cap gasket 320 to help prevent an over-compression situation that can have negative effects on the seal adjacent to the end of the cap 34.

The third spacer 300, as described, is configured to fill a gap between two threshold caps 34. Use of separate caps 34 may be used when the threshold 30 includes a pin capture configured to securely accept a shoot bolt from an astragal 60 (as shown in FIG. 1) on an inactive one of the door panels 4, 8 of a French door unit. Thus, the third spacer 300 is not only configured to seal a joint between separate caps 34, but is also configured to act as a pin capture. As such, the support 310 may be sufficient wide to provide an upper surface 364 leading to an aperture 366 of sufficient diameter to receive a shoot bolt from the astragal 60.

While several spacers 100, 200, 300 have been described herein, each of which has potentially unique elements, the similarities among the spacers 100, 200, 300 may be described in terms of the following paragraphs:

Paragraph A: A spacer (100, 200, or 300) for sealing a joint between a first framing component (20, 30, 34 or 50) and a second framing component (20, 30, 34, or 50) of an entryway (1), the spacer comprising:

a substantially uncompressible support (110, 210, or 310); and a first compressible gasket (120, 220, or 320) having a first uncompressed thickness T1 (e.g. $T_{TG}$), the first gasket being attached to a first surface (142, 242, or 342) of the support, wherein the first surface comprises at least one first boss (146, 246, or 346) extending therefrom by a distance D1 (e.g. $T_{BC}$), D1 being less than T1;

wherein the at least one first boss being configured to abut a portion of the first component to provide desired compression of the first gasket between the first component and the support.

Paragraph B: The spacer of paragraph A, further comprising:

a second gasket (jamb gasket, mullion gasket, or another cap gasket) having a second uncompressed thickness T2 (e.g. $T_{JG}$), the second gasket being attached to a second surface of the support, the second surface being opposite the first surface, such that the second gasket is configured to be disposed between the support and the second component.

Paragraph C: The spacer of Paragraph B, wherein the second surface comprises at least one second boss extending therefrom by a distance D2, D2 being less than T2, wherein the at least one second boss being configured to abut a portion of the second component to provide desired compression of the second gasket between the second component and the support.

Paragraph D: A method of sealing an end of an entryway component (30, 34), comprising:

providing a spacer (100, 200 or 300), the spacer comprising:

a substantially uncompressible support (110, 210, or 310); and a first compressible gasket (120, 220, or 320) having a first uncompressed thickness T1, the first gasket being attached to a first surface of the support, wherein the first surface comprises at least one first boss extending therefrom by a distance D1, D1 being less than T1;

aligning the spacer with the end of the entryway component, the spacer oriented with the first gasket facing the entryway component; and sealing the end by compressing the first gasket between the support and the entryway component until the at least one first boss contacts the entryway component.

Paragraph E: An entryway, comprising:

a first framing component;

a second framing component; and a spacer sealing a joint between the first component and the second component, the spacer comprising:

a substantially uncompressible support; and a first compressible gasket, having a first uncompressed thickness T1, the first gasket being attached to a first surface of the support, wherein the first surface comprises at least one first boss extending therefrom by a distance D1, D1 being less than T1;

wherein the at least one first boss abuts a portion of the first component to provide desired compression of the first gasket between the first component and the support.

Other embodiments that may not be generic to all of the illustrated examples may be described in terms of the following paragraphs:

Paragraph F: A support for limiting wear of a leading edge of a gasket used for sealing a joint between a first component and a second component of an entryway, the support comprising:

an attachment surface for accepting the gasket; and a shoulder (160, 260) raised relative to the attachment surface and located as a position preceding the leading edge of the gasket, the shoulder defining a protective pocket for positioning a corner of the gasket.

Paragraph G: The support of Paragraph F, where the shoulder has a variable height for form a ramp shape converging toward the leading edge of the support.

Paragraph H: The support of Paragraph F, where a bottom surface of the protective pocket is sunken relative to the attachment surface to increase the effective height of the shoulder.

Paragraph I: A spacer for sealing a joint between a first component and a second component of an entryway, the spacer comprising:

a substantially rigid support;

a first gasket attached to a first surface of the support such that the first gasket is configured to be compressed between the first component and the rigid support, and wherein the rigid support comprises means for allowing no more than a desired degree of compression of the first gasket between the first component and the support.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

We claim:

1. An entryway sealing spacer, the spacer comprising:

a substantially rigid support; and a first gasket having a first uncompressed thickness (T1), the first gasket being attached to a first surface of the support, wherein the first surface comprises at least one first boss extending therefrom by a first distance (D1), the first distance (D1) is less than the first uncompressed thickness (T1);

wherein, when the spacer is filling a gap between a first entryway component and a second entryway component, the at least one first boss abuts a portion of the first entryway component to limit a compression of the first gasket between the first entryway component and the support, wherein the first and second entryway components are selected from the group consisting of a threshold and a jamb, a threshold cap and a mullion, and a first threshold cap and a second threshold cap.

2. The spacer of claim 1, further comprising:

a second gasket having a second uncompressed thickness (T2) the second gasket being attached to a second surface of the support, the second surface being opposite the first surface, such that the second gasket is configured to be disposed between the support and the second entryway component.

3. The spacer of claim 2, wherein the second surface comprises at least one second boss extending therefrom by a second distance (D2), the second distance (D2) is less than the second uncompressed thickness (T2), wherein, when the spacer is filling the gap between the first entryway component and the second entryway component, the at least one second boss abuts a portion of the second entryway component to limit a compression of the second gasket between the second entryway component and the support.

4. The spacer of claim 1, wherein the support further comprises:
a shoulder, the shoulder is raised relative to the first surface and partially defining a pocket, the first gasket attached to the first surface with the shoulder adjacent a portion of the first gasket.

5. The spacer of claim 4, wherein a height (H) of the shoulder relative to the first surface varies,
wherein the height (H) is at a minimum along a leading edge of the support, and
wherein the height (H) increases as a function of distance from the leading edge to provide the shoulder with a ramped structure.

6. The spacer of claim 1, further comprising:
a projection extending from the first surface, the projection located on the first surface and configured to interact with the first component to align the spacer with the first entryway component.

7. The spacer of claim 1, further comprising:
a protrusion extending from the first surface, the protrusion including a plug portion shaped and positioned to extend into a channel of a weather-strip.

8. The spacer of claim 1, wherein the support includes a top surface and a plurality of tabs extending upwardly from the top surface,
wherein the tabs are configured to interact with a corner pad.

9. The spacer of claim 1, wherein the support comprises at least one area of weakness,
wherein the support may be separated at said area of weakness to change a size of the support.

10. The spacer of claim 1, wherein the first surface further comprises:
a plurality of ribs extending therealong.

11. The spacer of claim 1, wherein a leading edge of the support comprises a notch.

12. The spacer of claim 1, wherein a bottom edge of the support comprises a notch.

13. The spacer of claim 1, wherein an exterior edge of the support comprises a step.

14. The spacer of claim 1 further comprising a protective film removably applied to at least a portion of the first gasket on a surface of the first gasket opposite the support.

15. The spacer of claim 1, wherein the support further comprises an upper surface, the upper surface comprising an aperture configured to receive a bolt.

16. An entryway, comprising:
a first entryway component;
a second entryway component; and
a spacer filling a gap between the first entryway component and the second entryway component, the spacer comprising:
a substantially rigid support; and
gasket having an uncompressed thickness (T1), the gasket being attached to a surface of the support,
wherein the surface comprises at least one boss extending therefrom by a distance (D1), the distance (D1) is less than the uncompressed thickness (T1);
wherein the at least one boss abuts a portion of the first entryway component and limits a compression of the gasket between the first entryway component and the support wherein the first and second entryway components are selected from the group consisting of a threshold and a jamb, a threshold cap and a mullion, and a first threshold cap and a second threshold cap.

17. The entryway of claim 16, wherein the first entryway component is the threshold and the second entryway component is the jamb.

18. The entryway of claim 16, wherein the first component is the threshold cap and the second component is the mullion.

19. The entryway of claim 16, wherein the first component is the first threshold cap and the second component is the second threshold cap, wherein the support further comprises an upper surface, the upper surface comprising an aperture configured to receive a bolt.

20. The entryway of claim 16, wherein the gasket comprises at least one aperture, the at least one boss extends at least partially through the at least one aperture.

21. The entryway of claim 16, wherein the support further comprises:
a shoulder, the shoulder is raised relative to the surface and partially defines a pocket, the gasket is attached to the surface with the shoulder adjacent a portion of the gasket,
wherein a height (H) of the shoulder relative to the surface varies,
wherein the height (H) is at a minimum along a leading edge of the support, and
wherein the height (H) increases as a function of distance from the leading edge to provide the shoulder with a ramped structure.

22. An entryway sealing spacer, the spacer comprising:
a substantially rigid support; and
a gasket having an uncompressed thickness (T1) and at least one aperture, the gasket being attached to a surface of the support,
wherein the surface comprises at least one boss extending therefrom by a distance (D1) and into the at least one aperture, the distance (D1) is less than the uncompressed thickness (T1);
wherein, when the spacer is filling a gap between a first entryway component and a second entryway component, the at least one boss abuts a portion of the first entryway component between the first entryway component and the support, wherein the first and second entryway components are selected from the group consisting of a threshold and a jamb, a threshold cap and a mullion, and a first threshold cap and a second threshold cap.

* * * * *

UNITED STATES PATENT AND TRADEMARK OFFICE
CERTIFICATE OF CORRECTION

PATENT NO. : 9,624,716 B2
APPLICATION NO. : 14/717202
DATED : April 18, 2017
INVENTOR(S) : Mitchell et al.

Page 1 of 1

It is certified that error appears in the above-identified patent and that said Letters Patent is hereby corrected as shown below:

In the Claims

Claim 22, Column 14 at Line 52:
"the at least one boss abuts a portion of the first entryway component between the first entryway component and the support,"

Should read:
"the at least one boss abuts a portion of the first entryway component to limit compression of the gasket between the first entryway component and the support,"

Signed and Sealed this
Seventeenth Day of April, 2018

Andrei Iancu
*Director of the United States Patent and Trademark Office*